United States Patent
Bai et al.

(10) Patent No.: US 11,637,640 B2
(45) Date of Patent: Apr. 25, 2023

(54) SELF-CALIBRATION FOR IMPLICIT BEAMFORMING

(71) Applicant: Apple Inc., Cupertino, CA (US)

(72) Inventors: Kai Bai, San Jose, CA (US); Wassim El-Hassan, San Jose, CA (US); Linchao Liao, San Jose, CA (US); Ding Nie, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 16/948,618

(22) Filed: Sep. 25, 2020

(65) Prior Publication Data

US 2021/0099242 A1 Apr. 1, 2021

Related U.S. Application Data (60) Provisional application No. 62/906,351, filed on Sep. 26, 2019.

(51) Int. Cl.
| | | |
|---|---|---|
| *H04B 17/14* | (2015.01) | |
| *H04B 7/06* | (2006.01) | |
| *H04B 17/19* | (2015.01) | |
| *H04B 17/11* | (2015.01) | |
| *H04B 17/21* | (2015.01) | |

(52) U.S. Cl.
CPC ........... *H04B 17/14* (2015.01); *H04B 7/0617* (2013.01); *H04B 17/11* (2015.01); *H04B 17/19* (2015.01); *H04B 17/21* (2015.01)

(58) Field of Classification Search
CPC ...... H04B 17/14; H04B 7/0617; H04B 17/11; H04B 17/19; H04B 17/21
USPC ........................................................ 375/221
See application file for complete search history.

(56) References Cited

U.S. PATENT DOCUMENTS

| | | | |
|---|---|---|---|
| 2013/0024883 A1* | 1/2013 | Elmaleh | H04W 12/50 725/25 |
| 2014/0269554 A1* | 9/2014 | Shapira | H04B 17/18 370/329 |
| 2015/0111608 A1* | 4/2015 | Kazmi | H04W 52/367 455/522 |

* cited by examiner

*Primary Examiner* — Leila Malek
(74) *Attorney, Agent, or Firm* — Fay Kaplun & Marcin, LLP (57) ABSTRACT

A user equipment (UE) configured to perform self-calibration. The UE includes a first radio configured to perform implicit beamforming and further configured to transmit and receive signals during the calibration procedure. The UE further includes a first plurality of antennas communicatively coupled to the first radio, a second radio configured to transmit and receive signals during the calibration procedure and at least one second antenna communicatively coupled to the second radio. The calibration procedure includes the second radio transmitting a tone signal over the calibration frequency and a first antenna of the first radio receiving the tone signal and a second antenna of the first radio receiving the tone signal.

20 Claims, 8 Drawing Sheets

SELF-CALIBRATION FOR IMPLICIT BEAMFORMING

PRIORITY CLAIM/INCORPORATION BY REFERENCE

This application claims priority to U.S. Provisional Application Ser. No. 62/906,351 entitled "Self-Calibration for Implicit Beamforming" and filed on Sep. 26, 2019, the entirety of which is incorporated herein by reference.

BACKGROUND

Beamforming may refer to an antenna technique that is utilized to transmit a directional signal. A user equipment (UE) may be equipped to generate a beamformed signal that is to be transmitted to a particular reception point. Generating a beamformed signal may be characterized as either implicit beamforming or explicit beamforming. Implicit beamforming generally refers to generating a beamformed signal based on estimates that are performed at the transmitting device. In contrast, explicit beamforming generally refers to generating the beamformed signal based on feedback received from the reception point.

Implicit beamforming may use a calibration parameter that is specific to the UE. Conventionally, the calibration parameter is determined during the manufacturing process. However, this does not adequately account for factors that may be present during a real operating scenario. As a result, a beamformed signal may be inaccurate and/or possess insufficient quality. Further, conventional calibration methods are inconvenient because they are time consuming and typically require external testing equipment.

SUMMARY

Some exemplary embodiments relate to a user equipment (UE). The UE includes a first radio configured to perform implicit beamforming and further configured to transmit and receive signals during a calibration procedure at a calibration frequency. The UE further includes a first plurality of antennas communicatively coupled to the first radio, a second radio configured to transmit and receive signals during the calibration procedure and at least one second antenna communicatively coupled to the second radio.

Other exemplary embodiments are related to a method performed by a user equipment (UE) equipped with a first radio and a second radio, wherein the first radio is configured to perform implicit beamforming. The method includes selecting a calibration frequency and performing a calibration procedure for the first radio based on, at least, the calibration frequency, the calibration procedure including the first radio transmitting and receiving signals and the second radio transmitting and receiving signals during the calibration procedure.

Still other exemplary embodiments are related to one or more processors configured to perform operations. The operations include receiving, from a first receive chain of a first radio in a device, a tone signal at a calibration frequency, wherein the tone signal was transmitted by a second radio in the device, receiving, from a second receive chain of the first radio, the tone signal at the calibration frequency and determining a relative phase of the tone signal based on, at least, the tone signal received from the first receive chain and the second receive chain.

DETAILED DESCRIPTION

The exemplary embodiments may be further understood with reference to the following description and the related appended drawings, wherein like elements are provided with the same reference numerals. The exemplary embodiments describe a device, system and method to improve calibration for implicit beamforming. For example, a user equipment (UE) may be equipped with two or more radios. The exemplary embodiments relate to utilizing a first radio to determine a calibration parameter that is to be utilized by a second radio for implicit beamforming. Accordingly, the exemplary embodiments relate to a self-calibration method for implicit beamforming that may be performed at runtime.

Beamforming refers to an antenna technique that is utilized to transmit a directional signal. Throughout this description, a beamformed signal may be referred to as a beam. Generally, a beam may be generated by having a plurality of antennas radiate the same signal. Increasing the number of antennas radiating the same signal decreases the width of the radiation pattern and increases the gain. A beam may be propagated in any of a plurality of different directions. The direction in which a beam is propagated may be based on the phase and/or magnitude of the signal provided to each antenna. Thus, a beam may be propagated in a particular direction by appropriately weighting the phase and/or magnitude of the signal provided to each antenna.

Implicit beamforming generally refers to a mechanism configured to generate a beam that is intended for a particular reception point. A beam generated in accordance with implicit beamforming may be based, in part, on estimates performed at the transmission point. To provide a general example of implicit beamforming, consider the following exemplary scenario in which a first device transmits a beam to a second device. In this exemplary scenario, the first device is equipped with a radio that is configured to utilize two antennas. Each antenna is coupled to a respective transmit chain (TX chain) and receive chain (RX chain).

Initially, the second device may broadcast a signal. For example, the second device may broadcast a particular signal over a particular frequency band. At the first device, the signal from the second device is received at each antenna and then various signal processing is performed by the components of the corresponding RX chains (e.g., analog-to-digital conversion, filtering, etc.). The output from the RX chains may then be further processed by other components of the first device (e.g., baseband processor). This allows the first device to estimate the channel response and determine the direction in which the second device is located.

Implicit beamforming may rely on the assumption that the channel response in one direction (e.g., from the second device to the first device) is similar to the channel response in the opposite direction (e.g., from the first device to the second device). Accordingly, the first device generates a beam that compensates for the characteristics of the channel in the direction of the second device based on the estimates performed on the signal received from the second device. To generate the beam, a signal is provided to each TX chain. The components of the TX chain perform various signal processing functions that prepare the signal for transmission by their respective antennas. The phase of the signals provided to each TX chain are appropriately weighted so that when the signals are transmitted by their respective antennas, the signals form a beam that is directed towards the second device. This exemplary scenario is not intended to limit the exemplary embodiments to implicit beamforming performed in this manner and is only provided as a general example of how a beam may be generated in accordance with implicit beamforming.

Implicit beamforming may use a calibration parameter. The calibration parameter accounts for distortion that may be caused by the hardware of the device performing implicit beamforming. For example, as mentioned above, implicit beamforming may rely on the assumption that the channel response in one direction is similar to the channel response in the other direction. However, the components of the RX chains and the TX chains may cause phase differences between the channel responses. Accordingly, the calibration parameter enables the implicit beamforming mechanism to compensate for phase differences introduced by the hardware of the device.

The exemplary embodiments are described with regard to a UE equipped with a radio that is capable of performing Bluetooth implicit beamforming (BTIBF). Accordingly, the exemplary UE may be described as being configured to communicate in accordance with the Bluetooth communication protocol. However, reference to the Bluetooth communication protocol is merely for illustrative purposes and the exemplary embodiments are not limited to any particular communication protocol. The exemplary calibration methods may be performed by any electronic device equipped with a radio that is configured to perform implicit beamforming in accordance with any appropriate communication protocol.

Conventionally, determining the calibration parameter for BTIBF is done with an external device during the manufacturing process. However, this cannot account for factors that may be present in a real operating scenario. For example, factors such as the temperature of the operating environment and the placement of the user's hand may introduce distortion that should be accounted for by the calibration parameter. As a result, the beam may be inaccurate and/or possess insufficient quality. Further, conventional calibration methods may determine phase differences indirectly through power measurements. However, the power measurement dynamic range of the testing equipment and the corresponding step size used during testing limit the accuracy with which the calibration parameter is determined. Further, conventional calibration techniques are typically time consuming due to the number of phase sweeps needed.

The exemplary embodiments are described with regard to improving calibration for BTIBF. For example, instead of using external equipment, the exemplary embodiments may determine the calibration parameter by utilizing a coexisted radio (a radio in a coexistence relationship with the Bluetooth radio). For example, the UE's Bluetooth radio may communicate with a second coexisted radio (e.g., ISM, WiFi, UWB, cellular, etc.) to determine the calibration parameter. This allows the UE to perform self-calibration for BTIBF and eliminates the need to utilize external testing equipment to determine the calibration parameter. As a result, the exemplary embodiments enable the UE to conveniently determine the calibration parameter at run time and thus, adapt the calibration parameter to the factors present in the current operating scenario. Further, the exemplary embodiments may measure the phase differences directly and thus, a more precise calibration parameter may be determined. As mentioned above, reference to BTIBF is merely for illustrative purposes, the exemplary calibration methods may apply to any type of implicit beamforming performed in accordance with any appropriate communication protocol.

Figure 1:
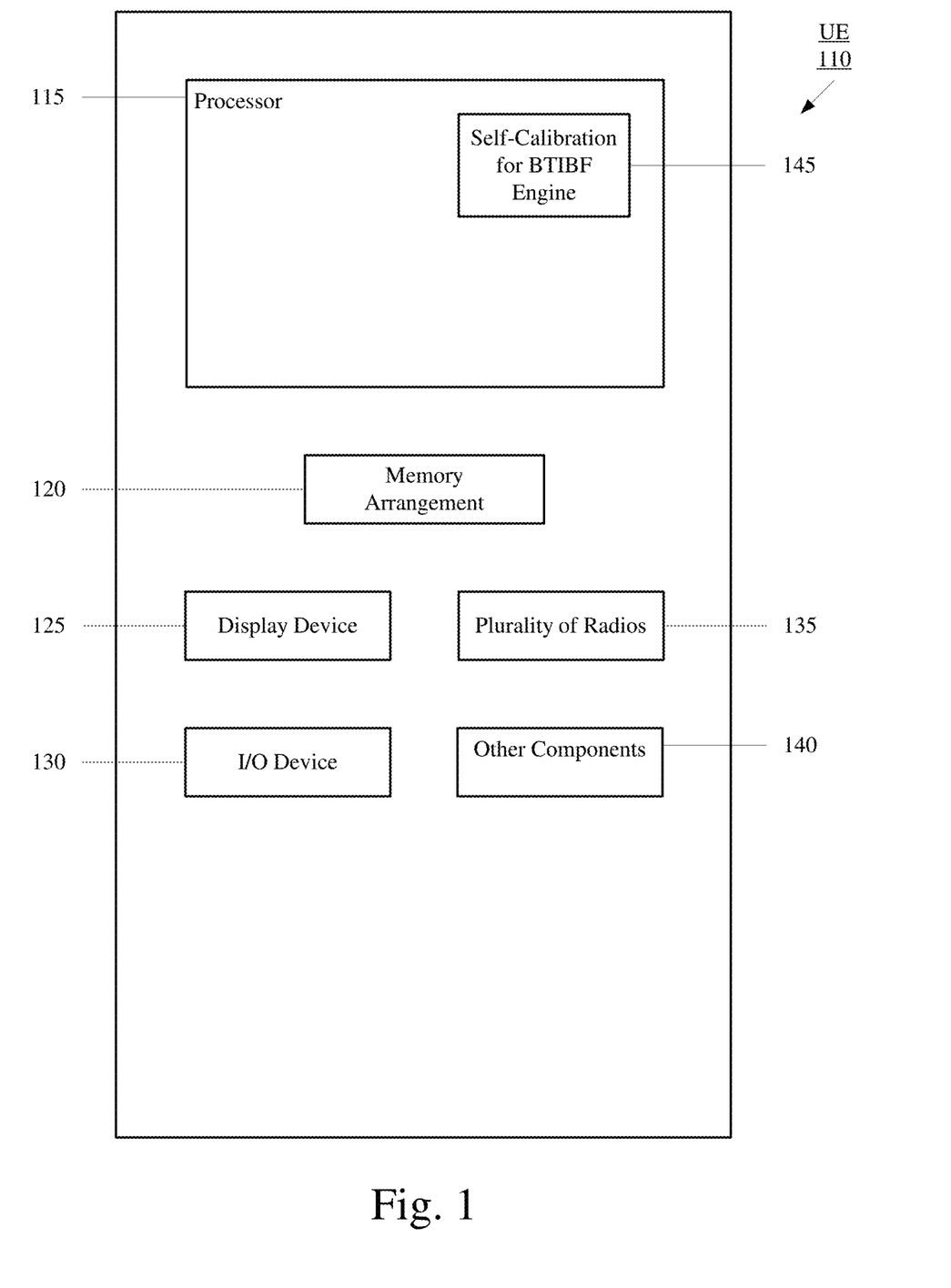
FIG. 1 shows an exemplary UE according to various exemplary embodiments.

FIG. 1 shows an exemplary UE 110 according to various exemplary embodiments. The UE 110 may represent any electronic device configured to perform implicit beamforming. The UE 110 may include a processor 115, a memory arrangement 120, a display device 125, an input/output (I/O) device 130, a plurality of radios 135 and other components 140. The other components 140 may include, for example, an audio input device, an audio output device, a battery that provides a limited power supply, a data acquisition device, ports to electrically connect the UE 110 to other electronic devices, etc.

As will be described below with reference to FIG. 3, the plurality of radios 135 may include a Bluetooth radio configured to perform BTIBF and a second coexisted radio. The UE 110 may utilize the second coexisted radio to determine the calibration parameter for BTIBF.

Returning to FIG. 1, the processor 115 may be configured to execute a plurality of engines of the UE 110. For example, the processor 115 may execute a self-calibration for BTIBF engine 145. The self-calibration for BTIBF engine 145 may cause a first radio of the plurality of radios 135 that is configured to perform BTIBF to communicate with a second coexisted radio of the plurality of radios 135. The self-calibration for BTIBF engine 145 may then determine the calibration parameter for BTIBF based on the communication between the first radio and the second radio. The functionality associated with the self-calibration for BTIBF engine 145 may also be represented as one or more separate, incorporated components of the UE 110 or may be one more modular components coupled to the UE 110, e.g., an integrated circuit with or without firmware. For example, the integrated circuit may include input circuitry to receive signals and processing circuitry to process the signals. The engines may also be embodied as one application or separate applications. In addition, in some UEs, the functionality described for the processor 115 is split among two or more processors, such as a baseband processor and an applications processor. The exemplary embodiments may be implemented in any of these or other configurations of a UE.

The memory 120 may be a hardware component configured to store data related to operations performed by the UE 110. The display device 125 may be a hardware component configured to show data to a user while the I/O device 130 may be a hardware component that enables the user to enter input. The display device 125 and the I/O device 130 may be separate components or may be integrated together, such as a touchscreen. The plurality of radios 135 may be hardware components configured to communicate in accordance with a plurality of different wireless communication protocols. Accordingly, the plurality of radios 135 may operate on a variety of different frequencies or channels (e.g., set of consecutive frequencies).

Figure 2:
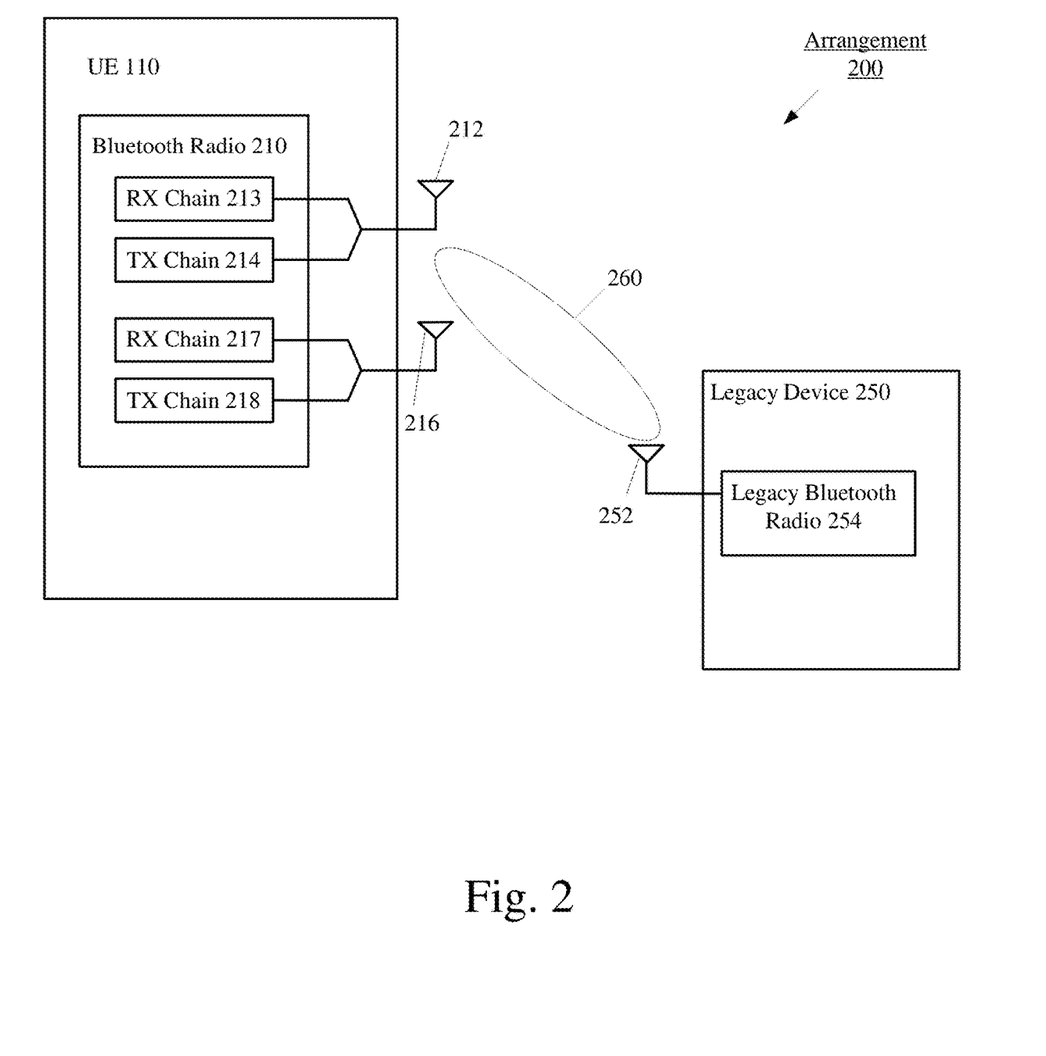
FIG. 2 shows an arrangement of the UE equipped with an exemplary Bluetooth radio transmitting a beam to a legacy device in accordance with Bluetooth implicit beamforming (BTIBF).

BTIBF may be achieved by using two or more antennas. Compared to signaling techniques that utilize a single antenna, BTIBF may provide a transmitting device with an increase in power gain and transmission range. Since BTIBF does not rely on feedback from the reception point, it is capable of delivering a beam to a legacy device. FIG. 2 is provided below to show an example of how BTIBF may be performed using the calibration parameter.

FIG. 2 shows an arrangement 200 of the UE 110 equipped with an exemplary Bluetooth radio 210 transmitting a beam 260 to a legacy device 250 in accordance with BTIBF. The Bluetooth radio 210 may be one of the plurality of radios 135 included in the UE 110 of FIG. 1.

The Bluetooth radio 210 is configured to utilize a first antenna 212 and a second antenna 216. The first antenna 212 is coupled to a first RX chain 213 and a first TX chain 214. The second antenna 216 is coupled to a second RX chain 217 and a second TX chain 218. Generally, an RX chain includes components to perform radio frequency (RF) reception functions. For example, the components of the RX chains 213, 217 may include, but are not limited to, an analog-to-digital converter (ADC), an amplifier, a down converter, a filter, etc. Generally, the TX chain includes components to perform RF transmission functions. For example, the components of the TX chains 214, 218 may include, but are not limited to, a digital-to-analog converter (DAC), an amplifier, an up converter, etc.

The legacy device 250 includes an antenna 252 coupled to a legacy Bluetooth radio 254. The legacy device 250 may further include other components (not pictured) such as, but not limited to, a baseband processor, an audio output device, a power source, etc.

In accordance with BTIBF, the legacy device 250 may initially broadcast a signal (not pictured) from the antenna 252. The signal is received by each antenna 212, 216 of the Bluetooth radio 210 and processed by their respective RX chains 213, 217. The output of the RX chains 213, 217 may then be further processed by a baseband processor of the UE 110. This allows the UE 110 to estimate the phase difference from the receiver paths associated with each antenna 212, 216. The estimate may be represented by $\Delta\emptyset_r = \emptyset_{r1} - \emptyset_{r2}$ where $\emptyset_{r1}$ is the phase delay associated with the receiver path corresponding to the first antenna 212 and $\emptyset_{r2}$ is the phase delay associated with the receiver path corresponding to the second antenna 216. Thus, the UE 110 estimates the channel response of the signal received from the legacy device 250.

As mentioned above, BTIBF may rely on the assumption that the channel response of the communication channel from the legacy device 250 towards the UE 110 is similar to the channel response of the communication channel from the UE 110 towards the legacy device 250. Based on this concept, the UE 110 may generate a beam in the direction of the legacy device 250 based on the channel response estimated from the received signal. Thus, the phase of the signal to be transmitted by each TX chain 214, 218 compensates for the estimated channel response.

However, the outputs of the RX chains 213, 217 introduce phase differences and the TX chains 214, 218 may also introduce phase differences. If unaccounted for, the phase differences associated with the RX chains 213, 217 and the TX chains 214, 218 will degrade the performance of the BTIBF (e.g., the beam may be inaccurate and/or of insufficient quality). Accordingly, the signals provided to each TX chain 214, 218 for transmission by the antennas 212, 216 that are to form the beam 260 may also need to compensate for the phase differences associated with the RX chains 213, 217 and the phase differences associated with the TX chains 214, 218. The phase delta of the signals to be transmitted may be represented by $\Delta\emptyset_t = \Delta\emptyset_r + \Delta\Delta\emptyset$ where $\Delta\emptyset_r$ is the estimate performed above and $\Delta\Delta\emptyset$ represents the phase differences introduced by the RX chains 213, 217 and the TX chains 214, 218. Accordingly, $\Delta\Delta\emptyset$ is the calibration parameter and may be determined per device. As mentioned above, under conventional circumstance, the calibration parameter may be determined during the manufacturing process.

The exemplary embodiments relate to determining the calibration parameter for BTIBF in a more convenient and efficient manner than conventional approaches. FIG. 3 is provided below as a general example of the hardware that may be utilized by the exemplary embodiments to determine the calibration parameter for BTIBF.

Figure 3:
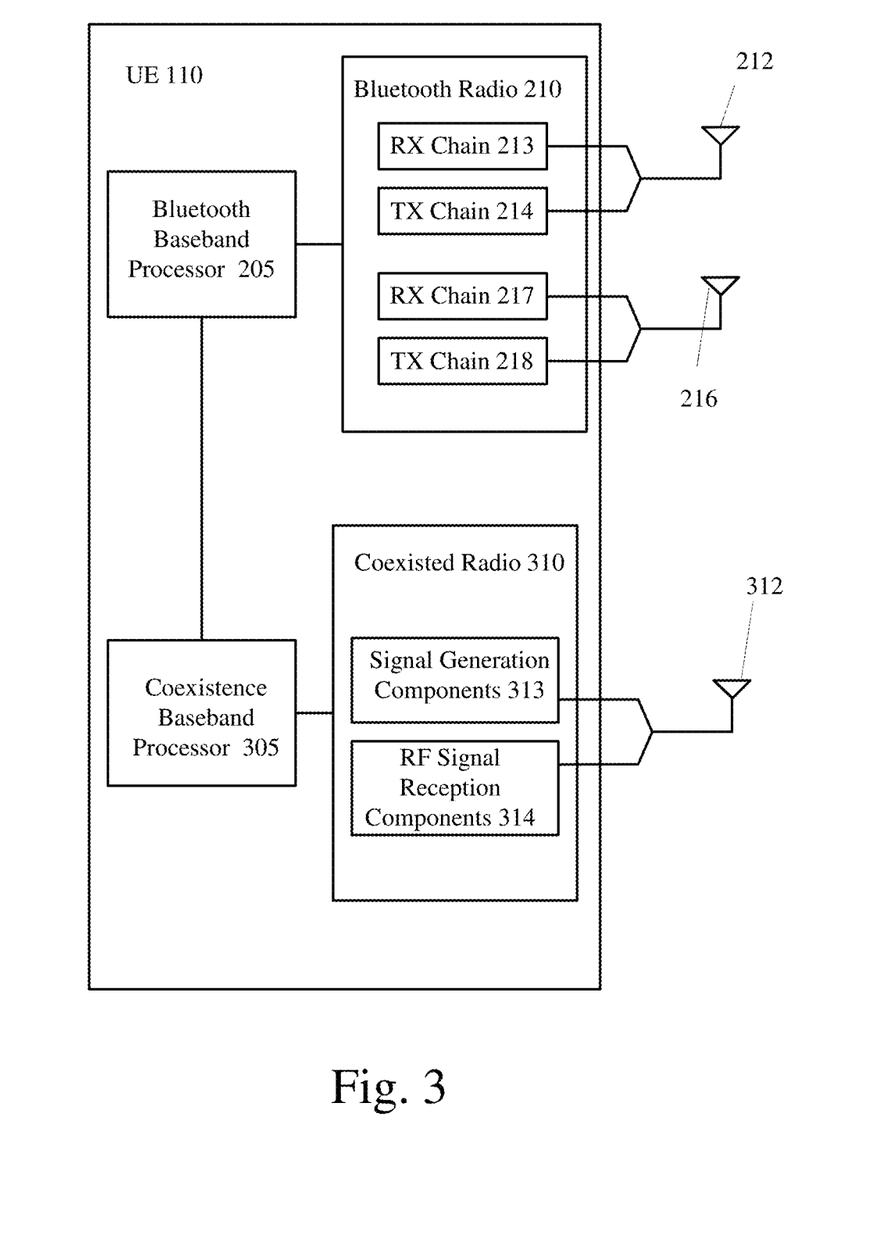
FIG. 3 shows the exemplary UE configured to perform self-calibration for BTIBF and equipped with the Bluetooth radio and a second coexisted radio.

FIG. 3 shows the UE 110 configured to perform self-calibration for BTIBF and equipped with the Bluetooth radio 210 and a second coexisted radio 310. The components of the Bluetooth radio 210 are described above with regard to FIG. 2.

The coexisted radio 310 includes an antenna 312, signal generation components 313 and RF signal reception components 314. The signal generation components 313 may represent any combination of hardware, software and/or firmware of the coexisted radio 310 and/or the corresponding processor 115 that are configured to generate a signal that is to be transmitted via the antenna 312. The RF signal reception components 314 may represent any combination of hardware, software and/or firmware of the coexisted radio 310 and/or the corresponding processor 115 that are configured to process a signal that is to be received via the antenna 312. For example, the RF signal reception components 314 may be configured to perform the functionality of a Fast Fourier transform (FFT) receiver.

In one exemplary embodiment, the second coexisted radio 310 may be configured to communicate with a wireless local area network (WLAN) e.g., WiFi. However, the second coexisted radio 310 may be any type of radio configured to communicate over the same frequency bands as the Bluetooth radio 210. As mentioned above, BTIBF is provided for illustrative purposes and the exemplary embodiments may apply to any type of implicit beamforming. Thus, the exemplary embodiments may apply to any pair of radios that are configured to communicate over the same frequency bands where at least one radio is configured to perform implicit beamforming.

To determine the calibration parameter, the UE 110 (e.g., the self-calibration for BTIBF engine 145) may coordinate over the air signaling between the Bluetooth radio 210 and the coexisted radio 310. As will be described below with FIG. 4 and FIG. 7, the over the air signaling between the Bluetooth radio 210 and the coexisted radio 310 allows the UE 110 to perform self-calibration to determine the calibration parameter at run time.

During operation, the UE 110 may utilize any of a plurality of different components to determine the calibration parameter based on the over the air signaling between the two radios 210, 310. For example, the Bluetooth radio 210 may be connected to a Bluetooth baseband processor 205 and the coexisted radio 210 may be connected to a coexistence baseband processor 305. The Bluetooth baseband processor 205 and the coexistence baseband processor 305 may be configured to communicate with one another and/or an applications processor (not pictured). In some embodiments, the Bluetooth baseband processor 205 may perform processing to determine the calibration parameter using information received from the coexistence baseband processor 305. In other embodiments, the coexistence baseband processor 305 may perform processing to determine the calibration parameter using information received from the Bluetooth baseband processor 205. In further embodiments, the applications processor may perform processing to determine the calibration parameter using information received from at least one of the Bluetooth baseband processor 205 and the coexistence baseband processor 305. In further embodiments, a single baseband processor (not pictured) configured to perform the functions of both the Bluetooth baseband processor 205 and the coexistence baseband processor 305 may determine the calibration parameter. However, the exemplary embodiments are not limited to determining the calibration parameter using any particular configuration of processors. The exemplary embodiments may apply to any appropriate hardware, software, firmware or combination thereof performing being utilized determine the calibration parameter.

Since the calibration parameter can be determined at run time, BTIBF can adapt to the current operating environment of the UE 110. Further, unlike conventional methods that measure the phase difference indirectly through power measurements, the phase difference may be measured directly and thus, the exemplary embodiments provide a more precise calibration parameter. Another advantage provided by the exemplary calibration methods is that a minimal number of measurements are performed. Thus, compared to conventional methods that utilize phase sweeps, the exemplary calibration methods are able to determine the calibration parameter significantly faster.

Figure 4:
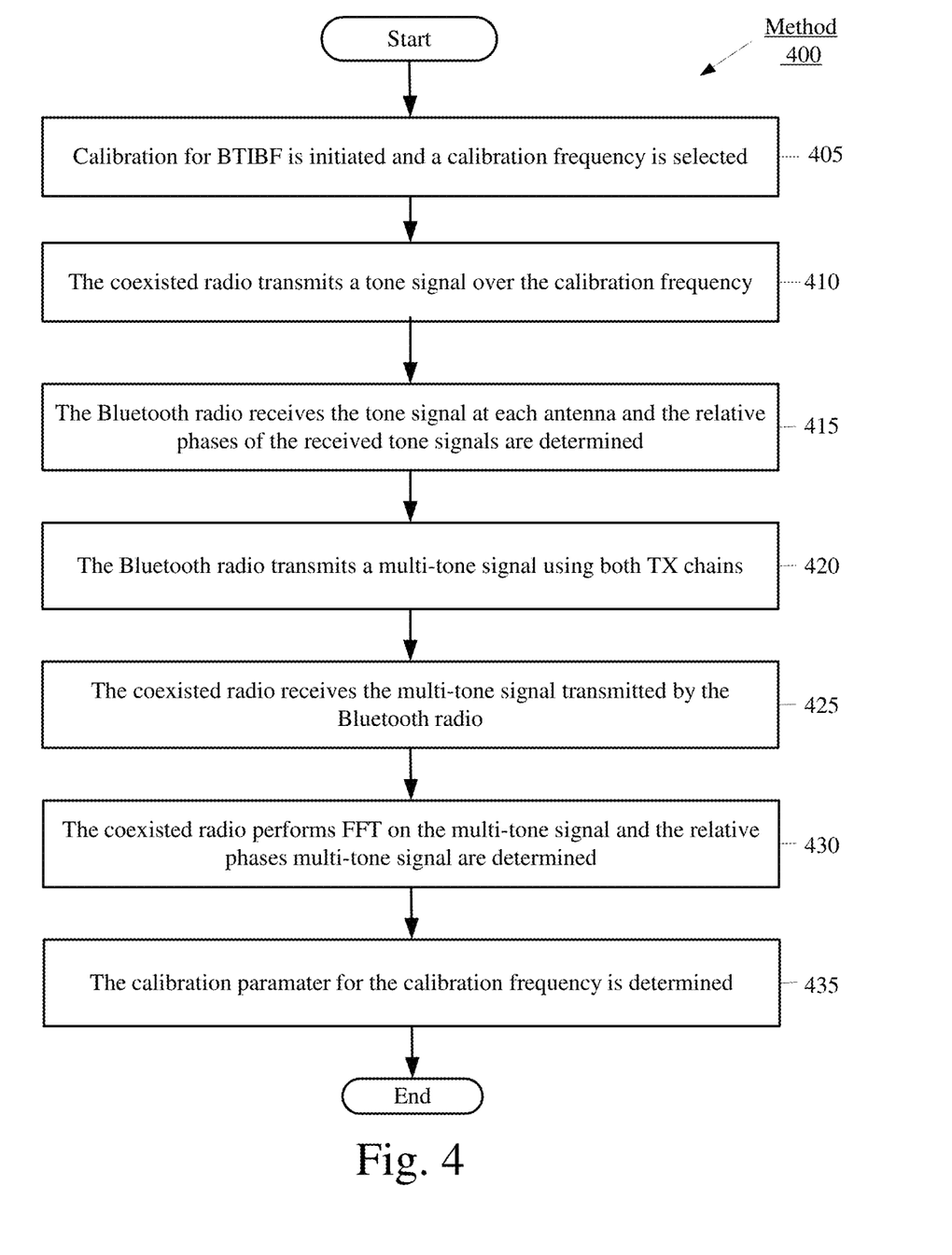
FIG. 4 shows an exemplary calibration method for BTIBF that utilizes a multi-tone signal.

FIG. 4 shows an exemplary calibration method 400 for BTIBF that utilizes a multi-tone signal. The exemplary method 400 will be described with regard to the UE 110 depicted in FIG. 3.

In 405, calibration for BTIBF is initiated.

Calibration for BTIBF may be determined for a beam that is to be transmitted over a particular frequency. Thus, initiating calibration for BTIBF may include selecting a particular calibration frequency (f).

Calibration for BTIBF may be initiated for any of a variety of different reasons. For example, calibration may be initiated based on factors such as a schedule, a predetermined amount of time since the previous instance in which the calibration parameter was determined, the occurrence of a predetermined number of transmissions, an impending transmission, identifying a degradation in accuracy and/or signal quality, detecting of environmental changes, any combination thereof, etc. However, the exemplary embodiments are not limited to initiating calibration based on any particular factor and the exemplary calibration method may be performed at any appropriate time.

In 410, the coexisted radio 310 transmits a tone signal over the calibration frequency (f). For example, the signal generation components 313 of the coexisted radio 310 may generate the tone signal to be propagated by the antenna 312.

In 415, the Bluetooth radio 210 receives the tone signal at each antenna 212, 216 and the relative phases of the received tone signals are determined. For example, each antenna 212, 216 of the Bluetooth radio 210 may receive the tone signal transmitted by the coexisted radio 310 over the calibration frequency (f). Each RX chain 213, 217 processes the received tone signals and outputs the processed tone signals to the baseband processor. The baseband processor measures the relative phase of the received tone signals. This may be represented by $\Delta\emptyset_r(f) = \emptyset_{r1}(f) - \emptyset_{r2}(f)$ where $\emptyset_{r1}(f)$ is the phase delay associated with the receiver path corresponding to the first antenna 212 and $\emptyset_{r2}(f)$ is the phase delay associated with the receiver path corresponding to the second antenna 216.

In 420, the Bluetooth radio 210 transmits a multi-tone signal using both TX chains 214, 218. The tones of the multi-tone signal may be generated based on either analog or digital methods. The components of an exemplary pair of TX chains 214, 218 that may generate a multi-tone signal using an analog method are described below with regard to FIG. 5. The components of an exemplary pair of TX chains 214, 218 that may generate a multi-tone signal using a digital method are described below with regard to FIG. 6.

Figure 5:
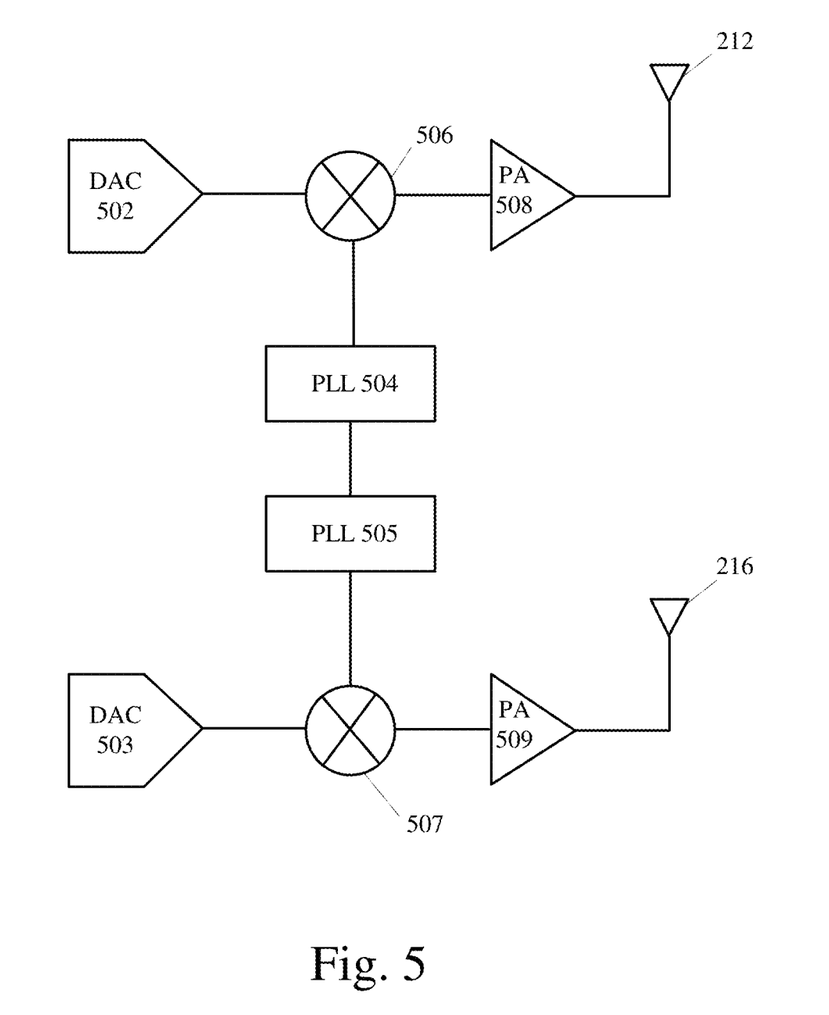
FIG. 5 shows the components of an exemplary pair of TX chains that may generate a multi-tone signal using one or more analog methods.
Figure 6:
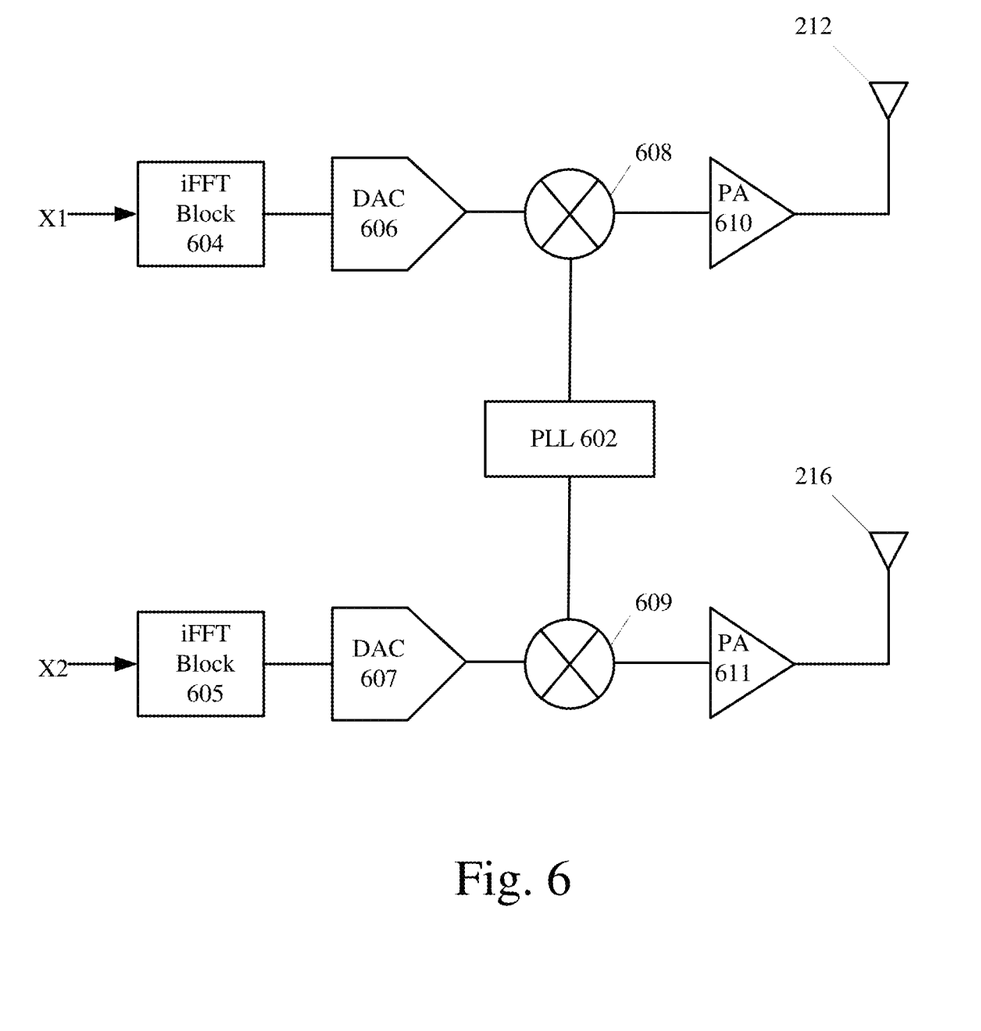
FIG. 6 shows the components of an exemplary pair of TX chains that may generate a multi-tone signal using one or more digital methods.

The tones may be generated so that the multi-tone signal may be processed by FFT components included in the RF signal reception components 314 of the coexisted radio 310. The tones of the multi-tone signal may be orthogonal to each other and the tones transmitted by the TX chain 214 may be different than the tones transmitted by the TX chain 218. The tones are transmitted by separate antennas (e.g., antennas 212, 216) but interpreted as a single multi-tone signal by the coexisted radio 310. Further, the tones of the multi-tone signal may be transmitted on frequencies $(f_1),(f_2)$ that may be adjacent to the calibration frequency (f) such that the spacing between the tones and the calibration frequency (f) is much smaller than the calibration frequency (f) itself. This may be used to cause any group delay at the coexisted radio 310 to be negligible. The spacing between the tones is configured to match the spacing of two different subcarriers so that the tones remain orthogonal to one another after FFT processing. FIGS. 5 and 6 provided below show examples of components that may be included in the TX chains 214, 218 and how they may be utilized to generate the multi-tone signal.

In 425, the coexisted radio 310 receives the multi-tone signal transmitted by the Bluetooth radio 210. For instance, each TX chain 214, 218 and their respective antennas 212, 216 transmit tones in accordance with the characteristics described above. Since the tones are configured to match the spacing of two different subcarriers, the coexisted radio 310 interprets the separately transmitted tones as a single multi-tone signal.

In 430, the coexisted radio performs FFT on the multi-tone signal and the relative phases of the multi-tone signal are determined. As mentioned above, since the spacing between the two tones and the calibration frequency (f) is much smaller than the calibration frequency (f) itself, the group delay between the tones of the multi-tone signal is negligible and will not interfere in the determining the phase. However, it is not required that group delay be negligible. A person of ordinary skill in the art would understand how the group delay parameter may be determined.

The FFT processing determines the phase shift of the tone transmitted by the antenna 212 $\emptyset t_1(f_1)$ and the phase shift of the tone transmitted by the antenna 216 $\emptyset t_2(f_2)$. Assuming the group delay is negligible, the coexisted radio 310 may assume that the phase shift determined for the tone transmitted on the adjacent frequency (e.g., $(f_1),(f_2)$) is about equal to the phase shift that would occur over (f). Thus, $\emptyset t_1(f_1) \approx \emptyset t_1(f)$ and $\emptyset t_2(f_2) \approx \emptyset t_2(f)$. Accordingly, the phase difference of the transmitter path may be determined, e.g., $\Delta\emptyset_t(f) = \emptyset t_1(f) - \emptyset t_2(f)$.

As described above in the exemplary scenario regarding how a beam may be generated in accordance with implicit beamforming, $\Delta\emptyset_r=\Delta\emptyset_t+\Delta\Delta\emptyset$ where $\Delta\emptyset_r$ is estimated and the calibration parameter $\Delta\Delta\emptyset$ is known. The method 400 relates to determining $\Delta\Delta\emptyset$ for (f). Since $\Delta\emptyset_r(f)$ is determined in 415 based on the tone signal received by the Bluetooth radio 210 and $\Delta\emptyset_t(f)$ is determined in 430 based on the multi-tone signal received by the coexisted radio 310, $\Delta\Delta\emptyset$ for (f) may be determined by $\Delta\Delta\emptyset(f)=\Delta\emptyset_t(f)-\Delta\emptyset_r(f)$.

In 435, the calibration parameter for the calibration frequency (f) is determined. As show above, the calibration parameter for the calibration frequency (f) may be determined based on $\Delta\Delta\emptyset(f)=\Delta\emptyset_t(f)-\Delta\emptyset_r(f)$. This process may be repeated for other frequencies of interest at any time during operation.

FIG. 5 shows the components of an exemplary pair of TX chains 214, 218 that may generate a multi-tone signal using an analog method. FIG. 5 will be described with regard to the UE 110 of FIG. 3 and the method 400 of FIG. 4. The exemplary pair of TX chains are not limited to generating the multi-tone signal using only these components. Additional and/or similar components referred to by different names may be utilized. FIG. 5 is merely provided as a general example of the types of components that may be utilized in the TX chains 214, 218 of the exemplary Bluetooth radio 210 when generating a multi-tone signal in accordance with an analog method.

The multi-tone signal may be generated in 420 of the method 400. To generate the multi-tone signal in accordance with an analog method, the components of the TX chain 214, 218 may include a first DAC 502 and a second DAC 503. The DACs 502, 503 may receive the digital signal from the baseband processor and convert the digital signal to an analog signal. The components may further include a first phase-locked loop (PLL) 504 and a second PLL 505. The PLLs 504, 505 may upconvert a tone signal on the frequencies $(f_1),(f_2)$ that are adjacent to the calibration frequency (f). Accordingly, the output of the first PLL 504 is combined with the output of the first DAC 502 at the first mixer 506 to ensure that the tone is transmitted over $(f_1)$. Subsequently, a first power amplifier (PA) 508 receives the output from the first mixer 506 where the tone is then provided to the antenna 212 for transmission over $(f_1)$. Similarly, the output of the second PLL 505 is combined with the output of the second DAC 503 at the second mixer 507 to ensure that the tone is transmitted over $(f_2)$. Subsequently, a second PA 509 receives the output from the second mixer 507 where the tone is then provided to the antenna 216 for transmission over $(f_2)$.

FIG. 6 shows the components of an exemplary pair of TX chains 214, 218 that may generate a multi-tone signal using a digital method. FIG. 6 will be described with regard to the UE 110 of FIG. 3 and the method 400 of FIG. 4. The exemplary pair of TX chains 214, 218 are not limited to generating the multi-tone signal using only these components. Additional and/or similar components referred to by different names may be utilized. FIG. 6 is merely provided as a general example of the types of components that may be utilized in the TX chains 214, 218 of the exemplary Bluetooth radio 210 when generating a multi-tone signal in accordance with a digital method.

In contrast to the analog method described in FIG. 5, the TX chains 214, 218 performing the digital method may include a single PLL 602. As mentioned above, the spacing of the tones of the multi-tone signal is based on the subcarrier spacing associated with the coexisted radio 310. For example, the coexisted radio 310 may be a WiFi radio and thus, operate based on orthogonal frequency division multiplexing (OFDM) functionality. In accordance with OFDM, subcarrier spacing may be about 312.5 kilohertz (KHz) and the bandwidth may vary between 20, 40, 80 and 160 megahertz (MHz). Bluetooth does not utilize OFDM and has a bandwidth of about 1 MHz. Due to the differences between the characteristics of OFDM and Bluetooth, generating the multi-tone signal that is to be transmitted by the Bluetooth radio 210 using only the single PLL 602 may use precise signal generation.

To provide an example of how a Bluetooth signal may be transmitted by the Bluetooth radio 210 using only a single PLL 602 in such a way that it may be received by the coexisted radio 310, consider the following exemplary scenario. Two sequences $x_1$ and $x_2$ are to be generated by performing an inverse Fast Fourier transform (iFFT) on two sequences $X_1, X_2$ in the frequency domain. As shown below, $x_1$ and $x_2$ each represents a sequence of 16 Bluetooth symbols. These symbols will be output by their respective TX chains 214, 218 as the part of the multi-tone signal. The structure of $x_1$ and $x_2$ are substantially similar to OFDM symbols and thus, may be received by the coexisted radio 310.

$x_1$={0.0625+0.0000i,0.0239+0.0577i,−0.0442+
0.0442i,−0.0577−0.0239i,0.0000−0.0625i,
0.0577−0.0239i,0.0442+0.0442i,−0.0239+
0.0577i,−0.0625+0.0000i,−0.0239−0.0577i,
0.0442−0.0442i,0.0577+0.0239i,0.0000+
0.0625i,−0.0577+0.0239i,−0.0442−0.0442i,
0.0239−0.0577i}

$x_2$={0.0625+0.0000i,0.0239−0.0577i,−0.0442−
0.0442i,−0.0577+0.0239i,0.0000+0.0625i,
0.0577+0.0239i,0.0442−0.0442i,−0.0239−
0.0577i,−0.0625+0.0000i,−0.0239+0.0577i,
0.0442+0.0442i,0.0577−0.0239i,0.0000−
0.0625i,−0.0577−0.0239i,−0.0442+0.0442i,
0.0239+0.0577i}

The two sequences $x_1, x_2$ may be based on the iFFT of $X_1, X_2$ in the frequency domain where $X_1$={0,0,0,1,0,0,0,0, 0,0,0,0,0,0,0,0} and $X_1$={0,0,0,0,0,0,0,0,0,0,0,0,0,1,0,0}. The iFFT equation is provided below by x(n).

$$x(n) = \frac{1}{N}\sum_{k=0}^{N-1} X(k)e^{j2\pi\left(\frac{k}{N}\right)n},$$

where n=0, 1, . . . , N−1 and N=16.

During operation, $X_1$ is selected by the baseband processor such that it has a non-zero subcarrier at the calibration frequency (f)−312.5 KHz and $X_2$ is selected such that it has a non-zero subcarrier at the calibration frequency (f)+312.5 KHz. $X_1$ is input into a first iFFT block 604 of the first TX chain 214 and $x_1$ is output for further processing by the TX chain 214. Similarly, $X_2$ is input into a second iFFT block 605 of the second TX chain 218 and $x_1$ is output for further processing by the TX chain 218. Since $X_1$ and $X_2$ are orthogonal to one another, $x_1$ and $x_2$ are also orthogonal to one another.

The baseband processor may utilize Quadrature Phase Shift Keying (QPSK) modulation when generating the sequences $X_1$ and $X_2$ which may be achieved bypassing a differential encoder of Bluetooth enhanced data rate (EDR) modulator which uses differential QPSK (DQPSK). This allows $x_1$ and $x_2$ to be perceived as OFDM symbols. Thus, the output at each antenna 212, 216 may be a repetitive sequence of essentially OFDM symbols where each is 16 microseconds (µs) long in the time domain. Since Bluetooth has a 1 mega symbol per second (MSps) data rate, the symbols that are perceived as OFDM symbols may have a 62.5 KHz subcarrier spacing and a total of 1 MHz bandwidth in the frequency domain.

Subsequently, $x_1$ is further processed by components such as a first DAC 606 and then subsequently upconverted by the output of the PLL 602 at the first mixer 608 to the calibration frequency (f). The output of the first mixer 608 may then be provided to the first PA 610 for transmission by the first antenna 212. Similarly, $x_2$ is then further processed by components such as a second DAC 607 and then subsequently upconverted by the output of the PLL 602 at the second mixer 609 to the calibration frequency (f). The output of the second mixer 609 may then be provided to the second PA 611 for transmission by the second antenna 216. The transmission of $x_1$ and $x_2$ may then be repeated by each respective TX chain 214, 218 to form the repetitive sequence.

From the perspective of the coexisted radio 310, the signals transmitted from the first antenna 212 and the second antenna 216 (e.g., $x_1$ and $x_2$) are combined after the phase delay and channel response are determined. Since the symbols are periodic every 16 (µs) (e.g., the length of the $x_1$ and $x_2$ in the time domain) the phase delay does not cause loss of orthogonality of $x_1$ and $x_2$.

Subsequently, the received signals may be down converted by the calibration frequency (f), sampled and then processed by the FFT components that may be included in the RF signal reception components 314 of the coexisted radio 310. After sampling, the coexisted radio 310 may obtain the data sequence with a period of 320 samples because in this example the sampling is about 20 times faster than at the Bluetooth radio 210. Subsequently, down sampling by a factor of 20 may be performed to obtain the sequence y(n) where $y(n)=e^{j\emptyset_{t1}}x_1(n)+e^{j\emptyset_{t1}}x_2(n)$. By performing FFT on y(n), Y(k) is derived.

$$Y(k) = \sum_{n=0}^{15} y(n) e^{j2\pi(\frac{n}{16})k} = \begin{cases} e^{j\emptyset_{t1}}, & \text{if } k = 3 \\ e^{j\emptyset_{t2}}, & \text{if } k = 13 \\ 0, & \text{otherwise}, k \in \{0, \ldots 15\} \end{cases}$$

Based on Y(k) the phase difference of the transmitter path may be determined, $\Delta\emptyset_t(f)=\emptyset t_1(f)-\emptyset t_2(f)$.

Figure 7:
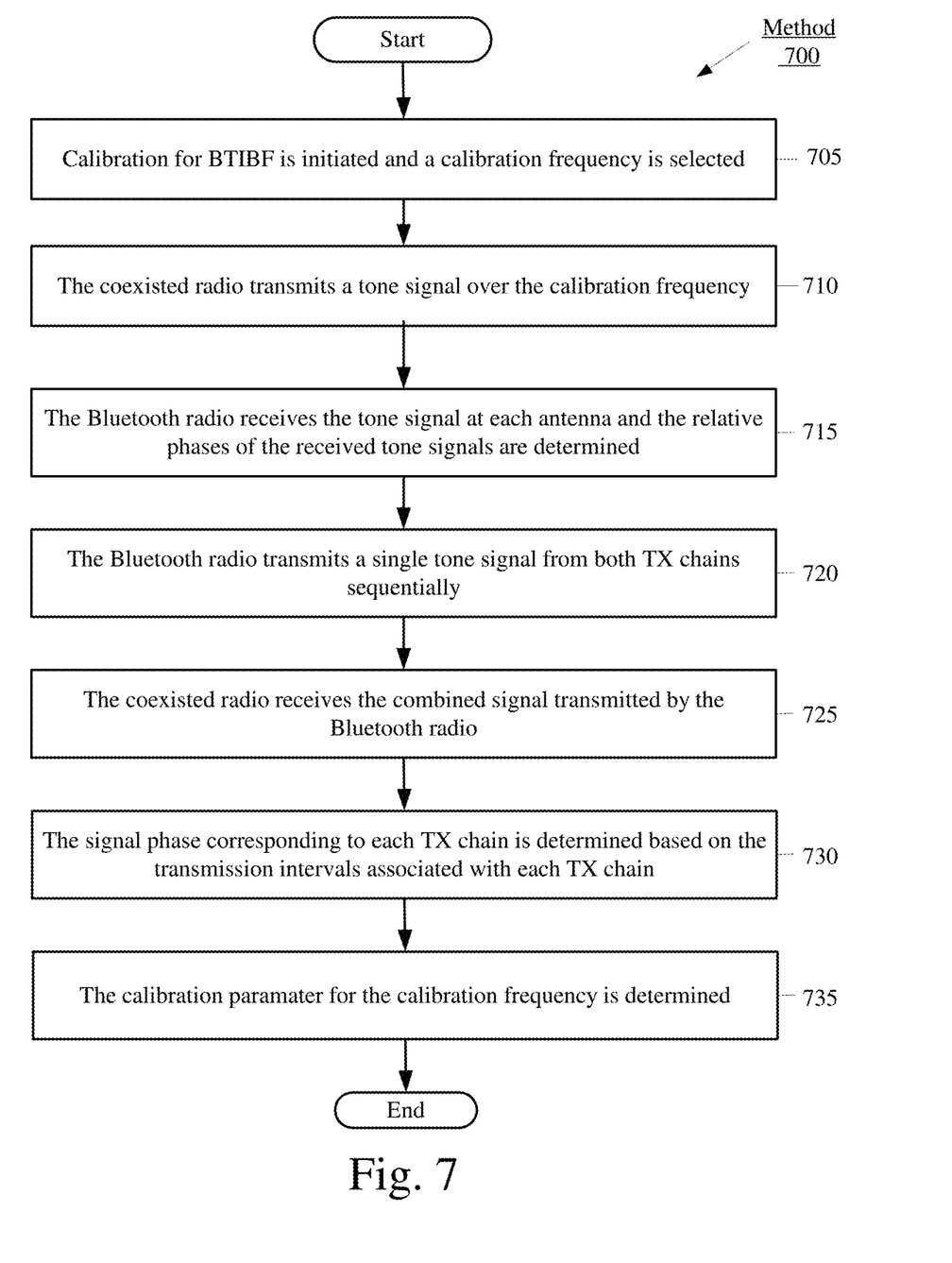
FIG. 7 shows an exemplary calibration method 700 for BTIBF that utilizes a single tone signal.

FIG. 7 shows an exemplary calibration method 700 for BTIBF that utilizes a single tone signal. The exemplary method 700 will be described with regard to the UE 110 depicted in FIG. 3.

In 705, calibration for BTIBF is initiated. Calibration for BTIBF may be determined for a beam that is to be transmitted over a particular frequency. Thus, initiating calibration for BTIBF may include selecting a particular calibration frequency (f). As mentioned above with regard to the method 400, Calibration for BTIBF may be initiated for any of a variety of different reasons.

In 710, the coexisted radio 310 transmits a tone signal over the calibration frequency (f). For example, the signal generation components 313 of the coexisted radio 310 may generate the tone signal and provide it to the antenna 312 for transmission.

In 715, the Bluetooth radio 210 receives the tone signal and the relative phases of the received tone signal are determined. For example, each antenna 212, 216 of the Bluetooth radio 210 may receive the tone signal transmitted by the coexisted radio 310 at the calibration frequency (f).

The respective RX chains 213, 217 process the received tone signals and output the processed tone signals to the baseband processor. The baseband processor measures the relative phase of the received tone signal. This may be represented by $\Delta\emptyset_r(f)=\emptyset_{r1}(f)-\emptyset_{r2}(f)$ where $\emptyset_{r1}(f)$ is the phase delay associated with the receiver path corresponding to the first antenna 212 and $\emptyset_{r2}(f)$ is the phase delay associated with the receiver path corresponding to the second antenna 216.

In 720, the Bluetooth radio 210 transmits a single tone signal from both TX chains 214, 218 sequentially. The transmission on interval for each TX chain 214, 218 is different and predefined. A silence interval is inserted between each TX chains 214, 218 transmission. Since each transmission on interval for each TX chain 214, 218 is different the signals corresponding to each TX chain 214, 218 may be differentiated from one another.

Figure 8:
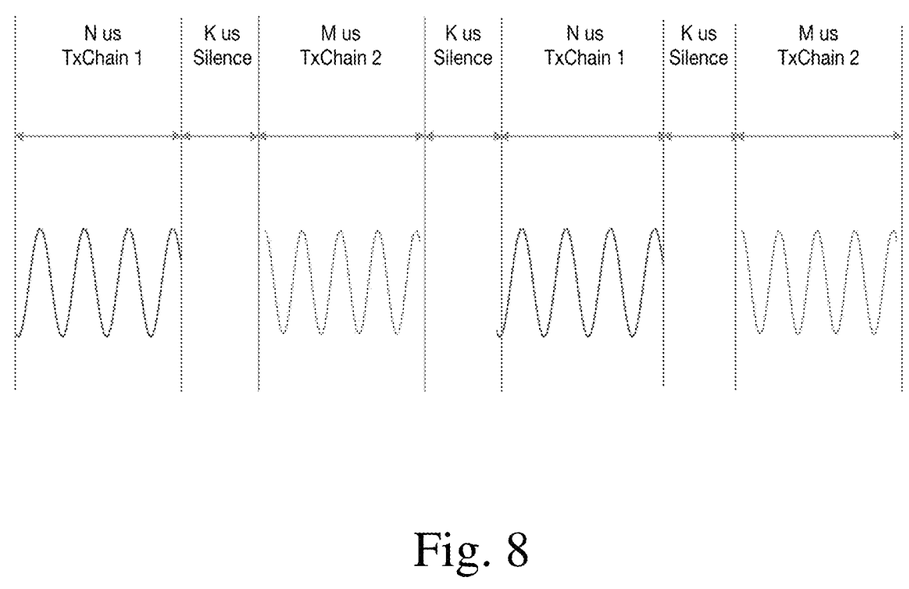
FIG. 8 shows an example of the transmission scheme that may be implemented for the exemplary calibration method that utilizes the single tone.

FIG. 8 shows an example of the transmission scheme that may be implemented for the exemplary calibration method 700 that utilizes the single tone as described in 720. N denotes TX chain 214 transmission on time, K denotes periods of silence and M denotes TX chain 216 transmission on time. N, K, M are in (µs) units. The timing of the transmission from each TX chain 212, 216 may be controlled by turning on and off the power amplifier for each TX chain 212, 216.

Returning to the method 700, in 725 the coexisted radio 310 receives the combined signal transmitted by the Bluetooth radio 210 in accordance with the transmission scheme described in 720 and depicted in FIG. 8. The coexisted radio 310 knows the timing of the transmission scheme and thus, may identify the transmission on times between the intervals of silence. As mentioned above, since each transmission on interval for each TX chain 214, 218 is different the signals corresponding to each TX chain 214, 218 may be differentiated from one another.

In 730, the signal phase corresponding to each TX chains 214, 218 is determined based on the transmission intervals associated with each TX chain 214, 218. For example, the received signal may be processed to determine the signal phase during the transmission on interval and interpolate the signal phase during the transmission off interval. Then the transmission phase difference may be determined based on $\Delta\emptyset_t(f,t_i)=\emptyset_{t1}(f,t_i)-\emptyset_{t2}(f,t_i)$, where $\emptyset_{t1}(f,t_i)$ denotes the phase at time $t_i$ from the signal transmitted from the TX chain 212, $\emptyset_{t2}(f,t_i)$ denotes the phase at time $t_i$ from the signal transmitted from the TX chain 216, and $\Delta\emptyset_t(f,t_i)$ represents the phase difference between the TX chain 212, 216. i is the time sample index, ranging from 0 to N−1, wherein N is the number of time samples. Multiple time samples can be averaged to improve the accuracy of the estimation. This may be represented by $$\Delta\emptyset_t(f) = \frac{1}{N}\sum_{i=0}^{N-1}\Delta\emptyset_t(f, t_i).$$

Similar to the method 400, with $\Delta\emptyset_r(f)$ determined in 715 and $\Delta\emptyset_t(f)$ determined in 730, the calibration parameter may be determined.

In 735, like in 435, the calibration parameter for the calibration frequency (f) is determined. As mentioned above, the calibration parameter for the calibration frequency (f) may be determined based on $\Delta\Delta\emptyset(f)=\Delta\emptyset_t(f)-\Delta\emptyset_r(f)$. This process may be repeated for other desired calibration frequencies at any time during operation.

The exemplary calibration methods are described as utilizing a first radio and a second radio of the same device. However, the exemplary embodiments are not limited to utilizing the radios of the same device to perform calibration for implicit beamforming. The exemplary calibration methods may also be performed with an external device. Thus, calibration methods that use an external device may benefit from the precise phase measurements and increased speed provided by the exemplary calibration methods described herein.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure covers modifications and variations of this disclosure provided they come within the scope of the appended claims and their equivalent.

What is claimed:

1. A user equipment (UE), comprising:
    a first radio configured to perform implicit beamforming and further configured to transmit and receive signals during a calibration procedure at a calibration frequency;
    a first plurality of antennas communicatively coupled to the first radio;
    a second radio configured to transmit and receive signals during the calibration procedure, the calibration procedure comprising the second radio transmitting a tone signal at the calibration frequency and a first antenna and a second antenna of the first plurality of antennas receiving the tone signal;
    at least one second antenna communicatively coupled to the second radio; and
    one or more processors configured to determine a relative phase of the tone signal based on, at least, the tone signal received at the first antenna and the second antenna of the first plurality of antennas.

2. The UE of claim 1, wherein the calibration procedure further comprises:
    the first radio transmitting a multi-tone signal;
    the second radio receiving the multi-tone signal; and
    the one or more processors determining a relative phase of the received multi-tone signal and determining a calibration parameter based on, at least, the relative phase of the tone signal and the relative phase of the multi-tone signal.

3. The UE of claim 2, wherein the multi-tone signal comprises at least two tones that are orthogonal to each other.

4. The UE of claim 2, wherein the first antenna of the first plurality of antennas transmits first tones of the multi-tone signal and the second antenna of the first plurality of antennas transmits second tones of the multi-tone signal, the first tones being different from the second tones.

5. The UE of claim 2, wherein the multi-tone signal is transmitted on frequencies that are adjacent to the calibration frequency such that a spacing between the tones of the multi-tone signal and the calibration frequency is smaller than the calibration frequency.

6. The UE of claim 1, wherein the calibration procedure further comprises:
    the first radio transmitting a first single tone signal via the first antenna of the first plurality of antennas for a first duration and a second single tone signal via the second antenna of the first plurality of antennas for a second duration, wherein the first duration and the second duration are different;
    the second radio receiving the first single tone signal and the second single tone signal as a combined signal; and
    the one or more processors determining a relative phase of the combined signal and determining a calibration parameter based on, at least, the relative phase of the tone signal and the relative phase of the combined signal.

7. The UE of claim 6, wherein the first single tone signal and the second single tone signal are transmitted sequentially with an intervening silence interval.

8. The UE of claim 1, wherein the first radio comprises a first receive chain configured to process signals received by the first radio via the first antenna, a first transmit chain configured to process signals to be transmitted by the first radio via the first antenna, a second receive chain configured to process signals received by the first radio via the second antenna and a second transmit chain configured to process signals to be transmitted by the first radio via the second antenna.

9. The UE of claim 1, wherein the first radio comprises a Bluetooth radio and the second radio comprises one of a Bluetooth radio, an Industrial, Scientific and Medical (ISM) radio, a WiFi radio, or an ultra-wideband radio.

10. A method, comprising:
    at a user equipment (UE) equipped with a first radio and a second radio, wherein the first radio is configured to perform implicit beamforming:
    selecting a calibration frequency; and
    performing a calibration procedure for the first radio based on, at least, the calibration frequency, the calibration procedure comprising the first radio transmitting and receiving signals and the second radio transmitting and receiving signals during the calibration procedure,
    wherein the first radio is communicatively coupled to at least two antennas, and the calibration procedure comprises:

transmitting, by the second radio, a tone signal over the calibration frequency;
receiving, at a first antenna of the first radio, the tone signal;
receiving, at a second antenna of the first radio, the tone signal; and
determining a relative phase of the tone signal based on, at least, the tone signal;
received at the first antenna and at the second antenna.

11. The method of claim 10, wherein the calibration procedure further comprises:
transmitting, by the first radio, a multi-tone signal;
receiving, by the second radio, the multi-tone signal;
determining a relative phase of the received multi-tone signal; and
determining a calibration parameter based on, at least, the relative phase of the tone signal and the relative phase of the multi-tone signal.

12. The method of claim 11, wherein the first antenna of the first radio transmits first tones of the multi-tone signal and the second antenna of the first radio transmits second tones of the multi-tone signal, the first tones being different from the second tones.

13. The method of claim 10, wherein the calibration procedure further comprises:
transmitting, by the first radio, a first single tone signal via a first antenna of the first radio for a first duration and a second single tone signal via a second antenna of the first radio for a second duration, wherein the first duration and the second duration are different;
receiving, by the second radio, the first single tone signal and the second single tone signal as a combined signal;
determining a relative phase of the combined signal; and
determining a calibration parameter based on, at least, the relative phase of the tone signal and the relative phase of the combined signal.

14. The method of claim 13, wherein the first single tone signal and the second single tone signal are transmitted sequentially with a silence interval between the first single tone signal and the second single tone signal.

15. One or more processors configured to perform operations comprising:
receiving, from a first receive chain of a first radio in a device, a tone signal at a calibration frequency, wherein the tone signal was transmitted by a second radio in the device; receiving, from a second receive chain of the first radio, the tone signal at the calibration frequency; and
determining a relative phase of the tone signal based on, at least, the tone signal received from the first receive chain and the second receive chain.

16. The one or more processors of claim 15, wherein the operations further comprise:
receiving, from the second radio, a multi-tone signal, wherein the multi-tone signal was transmitted by the first radio;
determining a relative phase of the received multi-tone signal; and
determining a calibration parameter based on, at least, the relative phase of the tone signal and the relative phase of the multi-tone signal.

17. The one or more processors of claim 15, wherein the operations further comprise:
receiving, from the second radio, a combined signal comprising a first single tone signal and a second single tone signal, wherein the first single tone signal was transmitted by the first radio for a first duration and the second single tone signal was transmitted by the first radio for a second duration, wherein the first duration and the second duration are different;
determining a relative phase of the combined signal; and
determining a calibration parameter based on, at least, the relative phase of the tone signal and the relative phase of the combined signal.

18. The one or more processors of claim 17, wherein the multi-tone signal comprises at least two tones that are orthogonal to each other.

19. The one or more processors of claim 17, wherein the multi-tone signal comprises first tones and second tones, wherein the first tones are different from the second tones.

20. The one or more processors of claim 16, wherein the tone signal comprises a first single tone signal of a first duration and a second single tone signal of a second duration, wherein the first duration and the second duration are different.

* * * * *